United States Patent [19]
Bennett et al.

[11] Patent Number: 5,954,278
[45] Date of Patent: Sep. 21, 1999

[54] FIBERGLASS CUTTING APPARATUS AND METHOD

[75] Inventors: Bobby Ben Bennett, Reidsville; James Charles Haas, Wilmington, both of N.C.

[73] Assignee: ETC. Industries, Inc., Eden, N.C.

[21] Appl. No.: 09/052,587

[22] Filed: Mar. 31, 1998

[51] Int. Cl.⁶ ........................................................ B02C 18/06
[52] U.S. Cl. ...................... 241/27; 241/186.35; 241/243; 241/280
[58] Field of Search .............................. 241/186.35, 243, 241/280, 27, 30

[56] References Cited

U.S. PATENT DOCUMENTS

| | | |
|---|---|---|
| 179,100 | 6/1876 | Cormack . |
| 204,837 | 6/1878 | Miles . |
| 262,051 | 8/1882 | Kelly et al. . |
| 579,305 | 3/1897 | Perkins ..................................... 241/223 |
| 817,382 | 4/1906 | Merrill ..................................... 241/223 |
| 1,307,761 | 6/1919 | Shelton ..................................... 241/88.2 |
| 2,150,984 | 3/1939 | Near et al. ............................ 241/101.4 |
| 2,417,599 | 3/1947 | Joyce, Jr. . |
| 2,509,147 | 5/1950 | Hurst . |
| 3,089,409 | 5/1963 | Tretheway et al. . |
| 3,508,461 | 4/1970 | Stream . |
| 3,648,554 | 3/1972 | Arnold et al. . |
| 3,815,461 | 6/1974 | Genson . |
| 3,825,192 | 7/1974 | Knight ................................ 241/186.35 |
| 3,873,290 | 3/1975 | Marzocchi . |
| 4,043,779 | 8/1977 | Schaefer . |
| 4,068,805 | 1/1978 | Oswald . |
| 4,119,277 | 10/1978 | Snyder et al. ........................... 241/167 |
| 4,146,184 | 3/1979 | Whitney . |
| 4,237,758 | 12/1980 | Lindner et al. . |
| 4,254,536 | 3/1981 | Lehner . |
| 4,265,151 | 5/1981 | Carruth et al. . |
| 4,287,799 | 9/1981 | Fujita et al. . |
| 4,373,650 | 2/1983 | Gay . |
| 4,576,621 | 3/1986 | Chappelear et al. . |
| 4,625,924 | 12/1986 | Killinger ............................. 241/186.35 |
| 4,637,286 | 1/1987 | Boggs . |
| 4,682,523 | 7/1987 | Johnson et al. . |
| 4,706,531 | 11/1987 | Blauhut et al. . |
| 5,003,855 | 4/1991 | Ciupak . |
| 5,076,503 | 12/1991 | Cook .......................................... 241/73 |
| 5,230,475 | 7/1993 | Gerner ..................................... 241/34 |
| 5,340,034 | 8/1994 | Jang . |
| 5,373,763 | 12/1994 | Takahara . |
| 5,447,276 | 9/1995 | Aldridge et al. . |
| 5,678,774 | 10/1997 | Bennett et al. ........................... 241/27 |
| 5,697,560 | 12/1997 | Bennett ..................................... 241/29 |

*Primary Examiner*—John M. Husar
*Attorney, Agent, or Firm*—Rhodes & Mason, PLLC

[57] ABSTRACT

Fiberglass filament waste is cut into segments with an apparatus comprised of a feeder that includes a cutting roller having a rotatable shaft with a plurality of spaced circular cutting blades mounted thereon, and a waste feeder having a discharge opening adjacent said roller for conveying said waste into engagement with the periphery of the blades, the feeder including at first and second spaced surfaces extending from a waste inlet opening to a waste discharge opening, at least one of the surfaces being pivotal adjacent the waste inlet opening to expand the discharge opening under pressure from waste being conveyed between the surfaces. At least one of the surfaces, which may be a surface of a conveyor belt, is moveable toward the discharge opening, while the other surface may be stationary, or move toward the discharge opening. In one embodiment, the lower surface moves toward the discharge opening, while the upper surface moves away from the discharge opening to equalize the volume of waste being fed. A slotted stationary plate supports the waste during cutting.

20 Claims, 3 Drawing Sheets

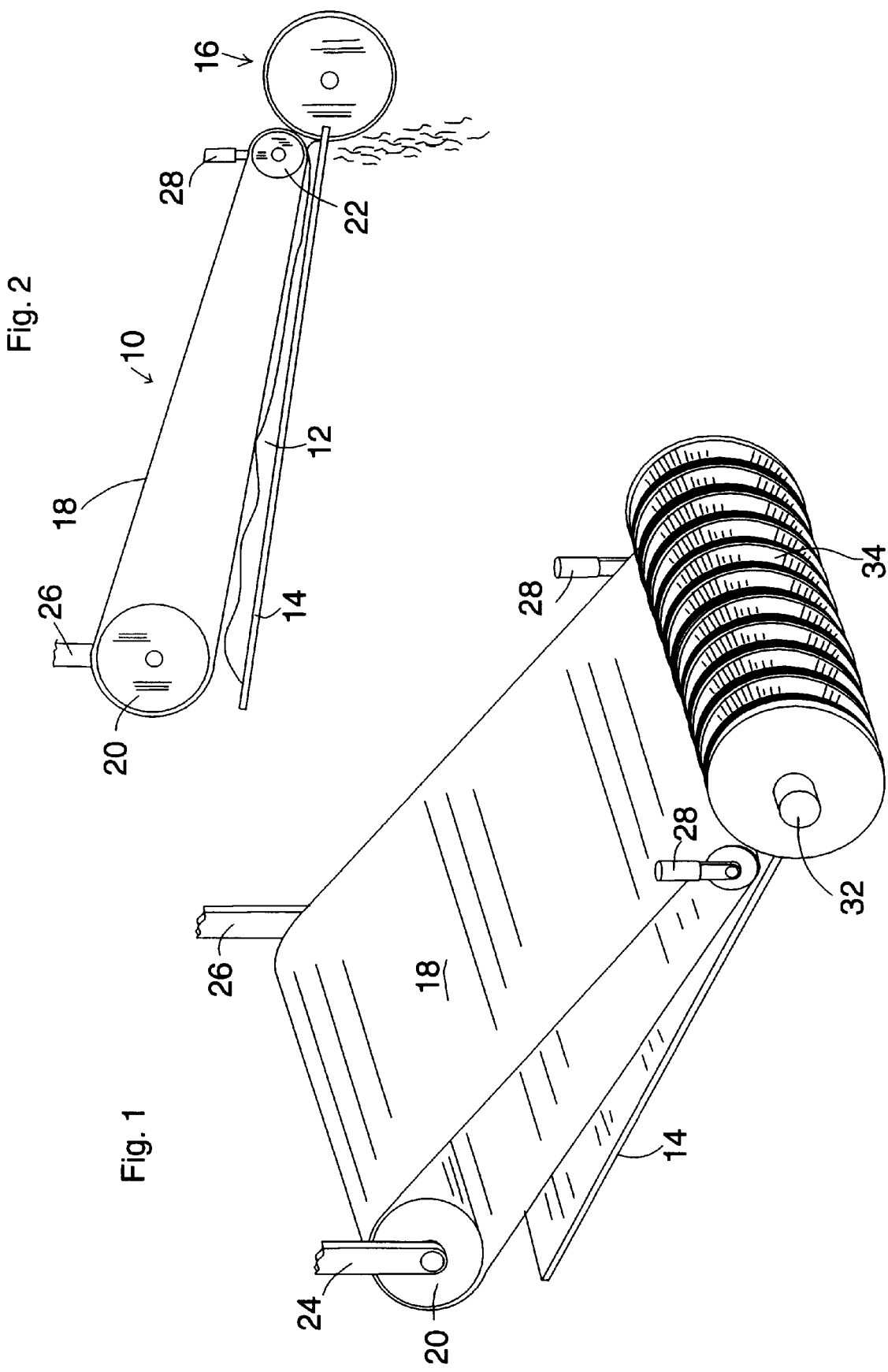

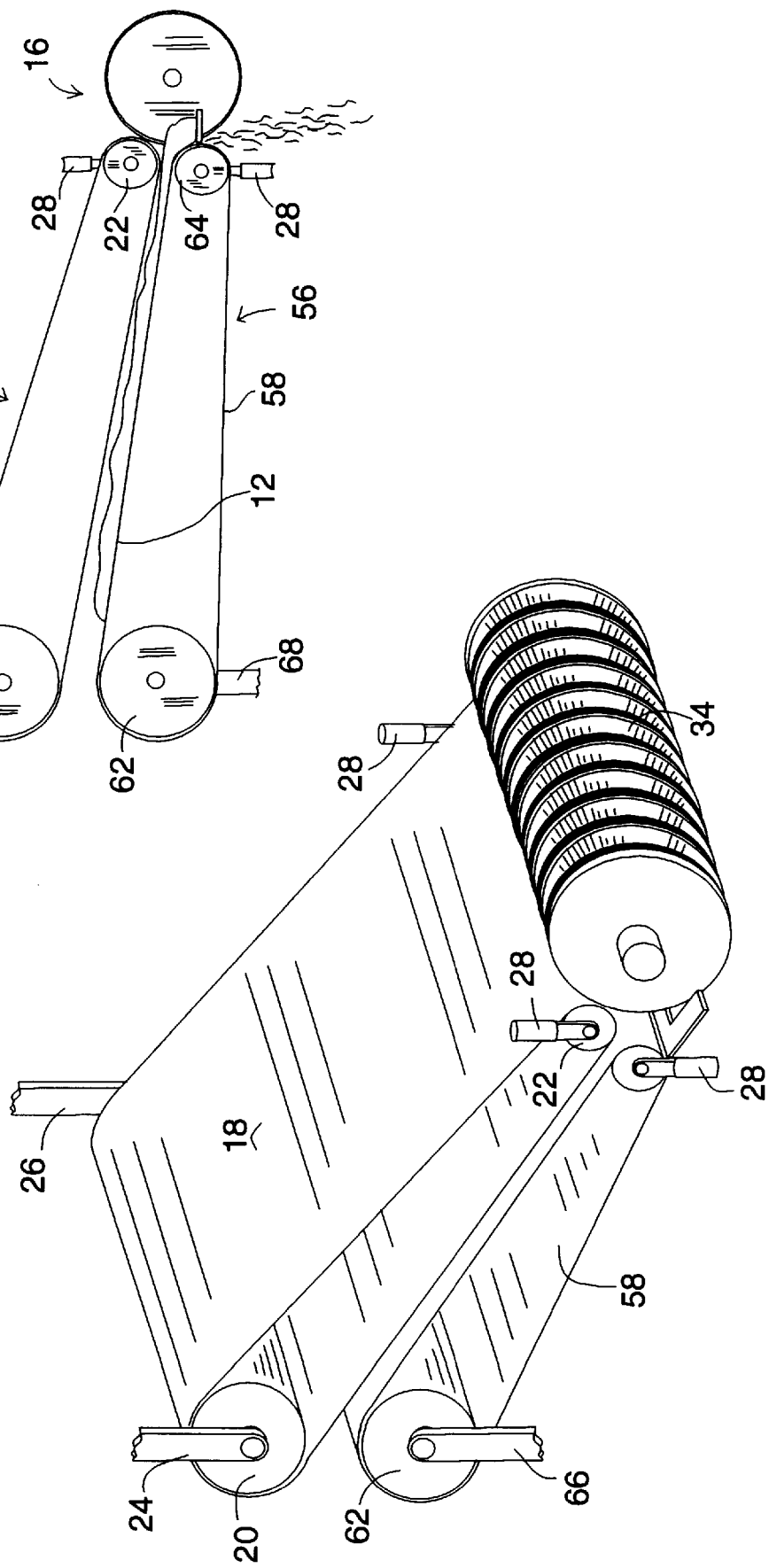

FIBERGLASS CUTTING APPARATUS AND METHOD

BACKGROUND OF THE INVENTION

The present invention relates to a method and apparatus for cutting fiberglass filament into staple fiber, and in particular to the conversion of bundles of discarded continuous fiberglass filament into usable staple fibers by compressing the fiberglass bundle and conveying the compressed bundle along a pathway into engagement with a rotating cutting blade to cut the continuous filaments into a plurality of staple fibers.

Continuous fiberglass filaments are manufactured by extruding molten glass through a spinneret, followed by attenuating the extruded material. The resultant filaments, after solidifying, may then be directed to another area for conversion into desired products, or collected on a bobbin for storage prior to further processing. Formation of the filaments also normally involves the treatment of the filaments with a binder to enhance the properties of the fiberglass in subsequent operations.

As used in describing the invention, the term "continuous filament" is intended to include a single filament or a plurality of filaments in a strand. Also, a "plurality of filaments" is intended to encompass a plurality of segments of a single filament in adjacent relationships, such as occurs when a single filament is wrapped around a bobbin tube.

When fiberglass packages are formed, the continuous filament is wound onto a tube utilizing various methods and apparatus well known in the pertinent art. When the package is to be used in a subsequent process, the tube is removed from the interior of the package. The inner end of the filament is then pulled from within the interior of the package to unwind the filament.

Waste fiberglass filament is produced during both extrusion of the fiberglass and during its subsequent use. For example, at the beginning of the extrusion process, the practice is to draw the initial filaments from the spinneret until uniform filaments are obtained, and then begin winding of the filaments. These initial filament segments are then discarded, or reclaimed by melting.

In use, all of the filament may not be unwound from the package as a result of the adhesion of adjacent filament sections on the outer part of the package. The final portion of the package comprised of a continuous band of fiberglass filament adhered by the treatment material, and commonly referred to in the pertinent industry as a "hull," has normally been discarded.

Other steps in the production of fiberglass, or in its subsequent use, can produce reject segments of fiberglass filaments or a combination of filament and clumps of pieces of fiberglass produced by discharge of molten fiberglass. These materials, and the above hulls, collectively referred to herein as "fiberglass filament waste," may be discarded, which is undesirable from both an economic as well as an environmental standpoint. In some instances, the material may be remelted and extruded again. However, conversion of the filament waste into a useful staple fibers having utility in various known applications, such as in the reinforcement of molded plastic articles or insulation, is preferred.

Numerous prior art patents describe cutting of fiberglass filaments into staple fiber. Generally, the apparatus and method disclosed in these patents involves engaging a continuous strand of one or a few fiberglass filaments immediately after extrusion, with a chopping roller rotating perpendicular to the path of the strand. The chopping roller is comprised of a roller core with a plurality of spaced chopping blades projecting radially outwardly from, and parallel to, the axis of the core. Normally, filaments are engaged between the blades of the chopping roller and an adjacent surface to create a bending action, breaking the continuous filaments into staple fiber segments.

Examples of these prior art teachings include the following patents:

| U.S. Pat. No. | Inventor(s) |
| --- | --- |
| 5,003,855 | Ciupak |
| 4,706,531 | Blauhut et al. |
| 4,637,286 | Boggs |
| 4,576,621 | Chappelear et al. |
| 4,373,650 | Gay |
| 4,287,799 | Fujita et al. |
| 4,265,151 | Carruth et al. |
| 4,254,536 | Lehner |
| 4,237,758 | Lindner et al. |
| 4,043,779 | Schaefer |
| 3,873,290 | Marzocchi |
| 3,815,461 | Genson |
| 3,648,554 | Arnold et al. |
| 3,508,461 | R. M. Stream |

While the apparatus and methodology described in the above patents is suitable for chopping continuous, extruded fiberglass filament into staple fibers, conversion of bundles of fiberglass filaments comprised of a substantial number of filaments, such as fiberglass hulls or other bundles of waste, into useful staple fiber is not possible in the described manner, since the waste simply contains too many filaments to be broken into staple lengths by the action of chopper blades. Instead, a method and apparatus operating on an entirely different principal is necessary.

Commonly assigned U.S. Pat. No. 5,678,774, issued Oct. 21, 1997; and U.S. Pat. No. 5,697,560, issued Dec. 16, 1997; both being incorporated herein by reference, describe methods and apparatus suitable for cutting bundles of fiberglass filaments into fiberglass staple. As described in these patents, a hull or other fiberglass bundle is conveyed under compression into the nip of a pair of rollers, namely a cutting roller and a compression roller. The cutting roller is comprised of a plurality of spaces rotating cutting blades having a spacing approximating the length of the desired fiberglass staple.

The compression roller includes a plurality of circumferential grooves to receive the cutting blades. The filaments of the fiberglass bundle are oriented substantially transverse to the axis of the conveyor. As the filaments enter the nip of the roller pair, they are cut into staple lengths. U.S. Pat. No. 5,697,560 further includes a second roller pair to chop staple exiting from the first roller pair, to increase the uniformity of the staple.

The above methods and apparatus have been found to perform well in the cutting of fiberglass hulls and other materials comprised of a plurality of filaments of a relatively limited volume, with the bundles being of generally uniform size. However, some fiberglass waste is of a relatively greater size. Also, the size of the bundles being cut may vary considerably. These fiberglass bundles also may be comprised of a mixture of filament and fiberglass drippings, requiring a different form of cutting. Also, a cutter operating at a considerably higher speed is needed. In order to facilitate the cutting of these materials, it has been found that certain modifications to the methods and apparatus described in the above patents is needed.

Accordingly, it is an aspect of the present invention to provide an improved method and apparatus for cutting bundles of fiberglass filament waste. It is a particular objective of the present invention to provide a method and apparatus for compressing and cutting bundles of continuous fiberglass filament into staple fiber using a single roller comprised of a plurality of rotating cutting blades positioned at the exit of, and substantially transverse to the axis of a bundle conveyor that is adapted to compress fiberglass bundles of varying size.

SUMMARY OF THE INVENTION

The apparatus of the present invention is generally comprised of a conveyor uniquely adapted to convey fiberglass filament waste into engagement with a rotating roller that includes a plurality of rotating cutting blades. The conveyor is especially designed to compensate for variations in the volume of waste being conveyed, so that a relatively uniform volume of waste is presented to the cutting blades.

While a cutter of the type described in the earlier commonly assigned applications may be used in combination with this conveyor, it has been found that improved results are obtained by using a cutter that cooperates with the conveyor discharge. This cutter, and its differences from the earlier cutters, will be described in detail herein.

The conveyor is designed to convey varying quantities of fiberglass waste into engagement with the cutter. This waste may be in the form of discrete bundles, such as hulls, or in the form of a continuous stream of waste that is deposited onto the conveyor. The conveyor includes a loading end for introducing the fiberglass waste and a discharge end positioned adjacent the cutter, whereby fiberglass waste carried by the conveyor is brought into engagement with the cutter.

The conveyor is comprised of a pair of opposed upper and lower surfaces that converge partially along at least a portion of the length of the conveyor in order to compress fiberglass waste introduced onto the conveyor. In alternative embodiments, one of the surfaces can be moveable toward the cutter, both of the surfaces can be moveable toward the cutter, or the lower surface can be movable toward the cutter, while the upper surface is movable away from the cutter.

More specifically, one of the surfaces, preferably the lower surface may be stationary, while the other surface, preferably the upper surface is moveable toward the cutter. For example, the lower surface may be a stationary plate having a loading end and a discharge end. Preferably, the plate is horizontal or is inclined downwardly toward the discharge end. The upper moveable surface may be the lower surface of a rotatable, continuous conveyor belt that extends around a pair of rollers, at least one of which is driven. The conveyor belt has a loading end around the first of the rollers and a discharge end around the second of the rollers.

The lower and upper conveyor surfaces preferably diverge from the discharge end to the loading end at an angle of from about 5° to about 60°, and desirably from about 15° to about 45° during normal operation. As noted above, however, the quantity or volume of fiberglass waste being fed onto the conveyor may vary considerably during operation. As a result, the conveyor may become blocked at the discharge end when feeding large volumes of waste. Therefore, instead of constructing the conveyor with a fixed angle between the upper and lower surfaces, it has been found preferable to provide for a variable angle between the surfaces.

Thus, one of the surfaces, preferable the surface formed by a part of the conveyor belt, has been designed to pivot at its loading end, with the discharge ends of the conveyor surfaces being biased toward each other at the minimum angle. As a result, when a large volume of fiberglass is conveyed into the discharge end of the conveyor, one of the surfaces is allowed to pivot at its loading end under the pressure of the waste against the surface at the discharge end, to enlarge the discharge opening. As a result, a greater volume of waste can be discharged from the conveyor, and blockage can be avoided.

The opening of the discharge end of the conveyor should be limited, however, to ensure that sufficient compression on the waste is still achieved for proper cutting, and to prevent so much waste from being fed to the cutter that proper cutting is not achieved. For these reasons, the opening of the discharge end is preferably limited to a maximum opening equal to about one-fourth of the blade diameter. Control of the opening may be achieved, for example, by using a spring, hydraulic cylinder, or the like, to urge the discharge end of the surface toward the other surface, and using a stop to limit opening to a predetermined degree.

In a second alternative, both surfaces can be inner surfaces of continuous conveyor belts. That is the upper surface can be the lower surface of a conveyor belt as described above, and the lower waste engaging surface can be the upper surface of a similarly constructed lower continuous conveyor belt. In this embodiment, either the upper belt, the lower belt, or both, can be pivotally mounted at its loading end and yieldably mounted at its discharge end to allow expansion of the discharge opening formed by the opposed surfaces of the belts. If both belts are so mounted, however, the stops should be adjusted so that the opening still does not exceed one-fourth of the blade diameter.

In a modified form of the second embodiment, the upper belt can be adapted to rotate so that the upper surface moved from the discharge end to the loading end, while the lower facing belt surface moves from the loading end to the discharge end. In this embodiment, the liner speeds of the upper belt to lower belt is preferably in a ratio of from about 1:1 to about 20:1, and desirably from about 1:1 to about 5:1. When operated in this manner, the lower belt conveys the waste toward the cutter, while the upper belt rubs or brushes against the upper surface of the waste to drag the upper peaks of the waste into valley areas, thereby leveling the waste much like a doctor blade is used with granular material, and thus increasing the uniformity of the waste quantity being fed to the cutter. It will be understood that the second embodiment may be modified to perform in this modified manner by using a reversible drive roller to rotate the belt.

Waste discharged from the conveyor is engaged by a cutter mounted at the conveyor discharge to cut or slice the waste into discrete segments. The cutter or cutting roller of the invention is comprised of a rotatable shaft, a plurality of circular cutting blades or disks supported perpendicular to the shaft at a predetermined distance or spacing from each other, and a drive means, such as an electric motor for rotating the shaft. Preferably, the shaft is rotated so that the blades rotate toward the conveyor, i.e., the blade peripheries will move downwardly against the waste, so that engagement of the blades with the discharged waste is substantially perpendicular.

Each blade is in the shape of a circular disk with a central shaft-receiving opening, and is preferably constructed, at least at its periphery, of a material having a hardness greater than the fiberglass to be cut. Preferably, the blades are diamond coated blades. It has been found that the diameter of the blades in the present invention should be substantially greater than the diameters of the blades used in the apparatus described in the earlier commonly assigned patents. In most applications, the blades will have a diameter of from about 6 to about 48 inches or larger, and preferably from about 12 to about 18 inches. The central opening in the blade will be substantially equal to the diameter of the shaft upon which the blades are mounted.

Disk-shaped spacers carried on the shaft alternate between the blades. These circular spacers also include a central opening for positioning of the spacers on the shaft. The diameter of the spacer is less than the diameter of the adjacent cutting blades, so that the blades project outwardly beyond the spacers. Desirably, the blades will project about one-third of the blade diameter beyond the outer periphery of the shaft and spacers, if used. The spacers may be formed of various materials but preferably are of a material that will withstand forces to which they are subjected during the high-speed rotation and cutting operations. Suitable materials include steel and aluminum. The width of the spacers, and thereby the spacing of the cutting blades, will normally be at least about 0.1 inch, and preferably from about 2 to about 10 inches.

The cutter will be positioned adjacent the discharge end of the conveyor so that the peripheries of the cutting blades are adjacent the discharge opening formed by the upper and lower facing surfaces, i.e., close enough so that the waste is engaged by the blades while still in a compressed condition. In the first embodiment described above, i.e., where a lower stationary surface is employed, the discharge end of the lower surface may include a plurality of spaced blade receiving slots, with the blades projecting into the slots. With this configuration, the waste is supported on the lower surface when cut, since the blades of the cutting roller will project in a non-engaging relationship into the slots in the end of the lower surface plate.

Similarly, when using a pair of conveyor belts, a stationary discharge plate that includes a plurality of spaced blade receiving slots is positioned at the discharge end of the lower conveyor belt, so that material discharged from the lower conveyor belt collects on the stationary slotted plate for cutting.

The roller drive means may be, for example, an electric motor geared to the shafts of the rollers. Preferably the drive means is adapted to rotate the cutting roller at a speed of up to about 500 rpm. The linear speed of the waste conveying conveyor is generally from about 50 to about 500 feet per minute. Thus, the present apparatus is capable of cutting up to about 10,000 pounds of waste per hour, as opposed to the apparatus described in the earlier commonly-assigned patents, which is designed to cut up to about 1,000 pounds of waster per hour.

In operation, fiberglass waste, which may be comprised of hulls, end findings, or combinations thereof, is loaded into the loading or input end of the conveyor and moved along the conveyor lower surface toward the conveyor discharge opening. During conveying, the opposed surfaces of the conveyor compress the filaments into a flattened state. In the modified second embodiment described above, the conveyor upper surface is rotated away from the discharge end, leveling the waste. The compressed waste is discharged from the discharge end of the conveyor onto the stationary plate and into engagement with the cutting blades, which are rotated toward the conveyor, so that the blade peripheries engage the waste in a downward, substantially perpendicular direction. As a result, the waste is cut into segments that are then discharged and fall, or are conveyed, to a suitable receptacle.

Other features of the invention will be apparent to one skilled in the art upon a reading of the detailed description of the invention that follows, taken together with the drawings. In the description, terms such as horizontal, upright, vertical, above, beneath and the like are used solely for the purpose of clarity in illustrating the invention, and should not be taken as words of limitation.

BRIEF DESCRIPTION OF THE DRAWINGS

FIG. 1 is a perspective view of a first embodiment of the apparatus of the present invention, with the supporting framework and drive means omitted for clarity.

FIG. 2 is a sectional side view of the apparatus of FIG. 1, showing feeding of waste.

FIG. 3 is a perspective view of a second embodiment of the apparatus of the present invention, with the supporting framework and drive means omitted for clarity.

FIG. 4 is a sectional side view of the apparatus of FIG. 3, showing feeding of waste.

DETAILED DESCRIPTION OF THE PREFERRED EMBODIMENT

Figure 6:
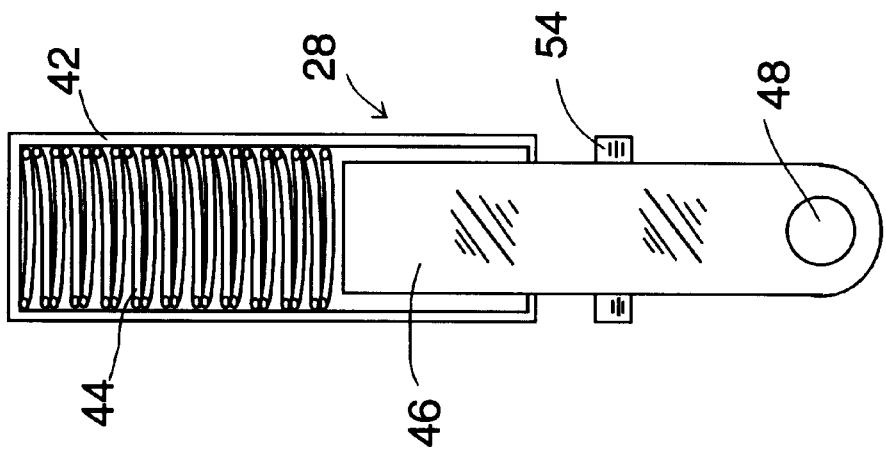
FIG. 6 is a sectional side view of a yieldable discharge end mount.

A first embodiment of the invention, as best illustrated in FIGS. 1 and 2, is comprised of a conveyor, generally 10, positioned to move filament waste 12 along an the upper surface of an inclined plate 14, while compressing the waste 12 to facilitate cutting by cutter, generally 16.

Conveyor 10 is comprised of continuous conveyor belt 18 around rollers 20 and 22. A drive means, not shown, rotates roller 20 to carry the lower surface of conveyor belt 18 in the direction of roller 22. Roller 20 is pivotally supported on frame members 24 and 26. Roller 22 is supported on yieldable mounts 28, so that the distance between the forward or discharge ends of conveyor 10 and plate 14, which together form a discharge opening, can be adjusted under the pressure of discharged waste 14.

Cutting roller 22 is comprised of a rotatable shaft 32, supporting a plurality of equi-spaced circular cutting blades or disks 34, and a plurality of alternating, equal-sized spacers 36 to space blades 34 at a predetermined, equal distance from each other. Blades 34 are of a disk or circular shape, and are diamond coated to enable the blades to cut the fiberglass filaments. In the preferred embodiment, blades 34 have a diameter of 6.0 inches, and a thickness of 0.035 inch. Blade 34 is spaced 3 inches apart on shaft 32. Shaft 32 is rotated by an electric motor, not shown.

Figure 5:
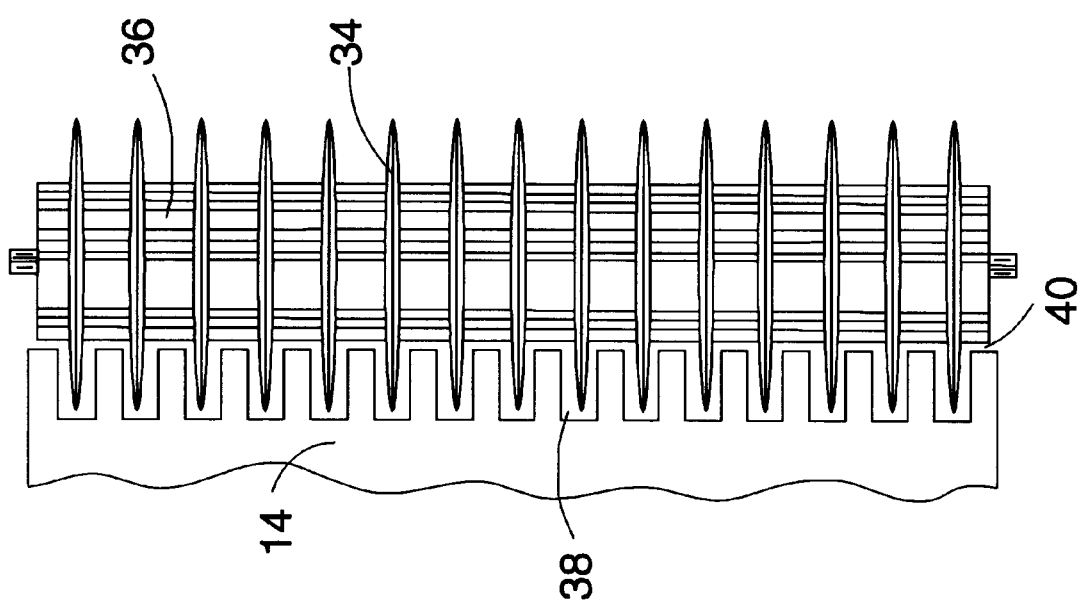
FIG. 5 is a detailed top view of the cutting roller and the discharge end of the conveyor plate of the embodiment of FIG. 1, showing the spacing of the cutter blades in the slots of the plates.

Plate 14 includes a plurality of equally spaced slots 38 extending inwardly from its discharge end 40. As shown in FIG. 5, blades 36 are positioned to extend into slots 38, so that waste 12 is supported on the upper surface of plate 14 when being cut by blades 34.

Mounts 28, illustrated in FIG. 6, are comprised of an outer cylinder 42 housing a spring 44, and a piston 46 insertable into cylinder 42 to compress spring 44 when conveyor 10 and plate 12 are forced apart by the pressure of waste 14. Piston 46 includes an opening 48 adjacent one end for attachment of mount 28 to shaft 32 of roller 16. A stop 54 limits the insertion of piston 46 into cylinder 42, thereby limiting the maximum discharge opening between conveyor 10 and plate 12.

The alternative embodiment shown in FIGS. 3 and 4 is a modification of the embodiment shown in FIGS. 1 and 2, with plate 12 being replaced by a second conveyor, generally 56. Conveyor 56 is constructed similar to conveyor 10, and is comprised of continuous conveyor belt 58 extending around rollers 62 and 64. A drive means, not shown, rotates roller 62 to carry the upper surface of conveyor belt 58 in the direction of roller 64. Roller 62 is pivotally supported on frame members 66 and 68. Roller 64 is supported on additional yieldable mounts 28, so that the distance between the forward or discharge ends of conveyors 56 can be adjusted under the pressure of discharged waste 14.

A stationary plate 68 that includes a plurality of equally spaced slots 70 extending inwardly from its discharge end is positioned at the discharge end of conveyor 56. Blades 36 extend into slots 70, so that waste 12 is supported on the upper surface of plate 68 when being cut by blades 34.

In operation of the embodiment shown in FIGS. 1 and 2, fiberglass waste 14 is fed onto the upper surface of plate 12 and are carried by conveyor 10, while being compressed, to cutter 16. As waste 14, under compression, is discharged from the discharge opening between plate 12 and conveyor 10, blades 34 cut waste 14 into segments that are discharged for collection.

In the alternative embodiment shown in FIGS. 3 and 4, waste 14 is conveyed on conveyor 56 to plate 68 where waste 14 is cut by cutter 16. Upper conveyor 10 may function as in the first embodiment, or the direction of belt 18 can be reversed, so that conveyor 10 serves to level, or equalize, the quantity of waste 14 carried on belt 58, while belt 18 conveys waste 14 to cutter 16. In both embodiments, a large volume of waste 14 at the discharge end of conveyor 10 will cause conveyor 10 to pivot at its loading end, while causing its discharge end to be forced open against mounts 28. Similarly, in the embodiment shown in FIGS. 3 and 4, the pressure will also causes conveyor 58 to pivot at its discharge end, moving its discharge end downwardly.

Certain modifications and improvements will occur to those skilled in the art upon a reading of the foregoing description. By way of example, only one of the conveyors shown in FIGS. 3 and 4 can be pivotally mounted while the other conveyor can be stationarily mounted. It should be understood that all such modifications and improvements have been deleted herein for the sake of conciseness and readability but are properly within the scope of the follow claims.

What is claimed is:

1. An apparatus for cutting fiberglass filament waste into segments comprising:

a) a cutting roller having a rotatable shaft with a plurality of spaced circular cutting blades mounted thereon, said blades having continuous peripheral cutting edges, and b) a waste feeder having a discharge opening adjacent said roller for conveying said waste into engagement with the periphery of said blades, said feeder including at first and second spaced surfaces extending from a waste inlet end to a waste discharge end, at least one of said surfaces being pivotal at the waste inlet end to expand said discharge opening.

2. The apparatus of claim 1, wherein one of said spaced surfaces is a surface of a continuous conveyor belt that extends around a first roller at said inlet end and a second roller at said discharge end.

3. The apparatus of claim 1, wherein said feeder includes a stationary waste support surface to support said waste during cutting of said waste by said blades.

4. The apparatus of claim 1, wherein the first surface is the lower surface of a first continuous conveyor belt and the second surface is the upper surface of a continuous conveyor belt, said belts extending around first rollers adjacent said inlet end and second rollers at said discharge end, at least one of said conveyor belts being pivotal at said first roller to move said second roller outwardly at said discharge end.

5. The apparatus of claim 1, wherein said cutter is comprised of a plurality of equally spaced circular cutting blades having peripheries positioned to engage said waste in a downwardly, substantially vertical direction.

6. An apparatus for cutting fiberglass filament waste into segments comprising:

a) a stationary plate having an upper surface, an inlet end and a discharge end;

b) a conveyor having an inlet end and a discharge end, said conveyor including a continuous belt extending around an inlet end roller and a discharge end roller, said belt having a lower surface spaced above said plate upper surface, said conveyor being pivotal at said conveyor inlet end to move said conveyor discharge end away from said plate discharge end; and c) a cutting roller having a rotatable shaft with a plurality of spaced circular cutting blades mounted thereon, said blades having continuous peripheral cutting edges.

7. The apparatus of claim 6, wherein said upper surface is angled downwardly.

8. The apparatus of claim 6, further including yieldable mounts supporting said discharge end roller.

9. The apparatus of claim 6, wherein the discharge end of said plate includes a plurality of inwardly-extending spaced slots, and said blades extend into said slots in non-contacting relationship, whereby said waste is supported on said plate while being cut by said blades.

10. An apparatus for cutting fiberglass filament waste into segments comprising:

a) a waste feeder having an inlet end and a discharge end, and including upper and lower conveyors, each of said conveyors having a continuous belt extending around an inlet end roller and a discharge end roller, the belt of said upper conveyor having a lower surface, and the belt of said lower conveyor having an upper surface spaced above said lower surface, at least one of said conveyors being pivotal at said inlet end to move said conveyor discharge end away from said plate discharge end;

b) a cutting roller having a rotatable shaft with a plurality of spaced circular cutting blades mounted thereon mounted adjacent said discharge end, said blades having continuous peripheral cutting edges; and c) a stationary plate at the discharge end of said waste feeder for receiving waste from said waste feeder, said plate including a plurality of inwardly-extending spaced slots, said blades extending into said slots in non-contacting relationship, whereby said waste is supported on said plate while being cut by said blades.

11. The apparatus of claim 10, wherein said upper and lower surfaces converge toward each other in the direction of said discharge.

12. The apparatus of claim 10, wherein said lower surface is rotatable toward said discharge end, and said upper surface is rotatable toward said discharge end.

13. The apparatus of claim 10, wherein said lower surface is rotatable toward said discharge end, and said upper surface is rotatable toward said inlet end.

14. The apparatus of claim 10, wherein both of said conveyors are pivotal at said inlet end.

15. A method of cutting fiberglass filament waste into segments comprising:

a) providing upper and lower opposed converging surfaces having inlet ends and discharge ends, said surfaces converging toward each other toward said discharge ends, said inlet ends forming a waste inlet end and said discharge ends forming a waste discharge end;

b) providing a cutter with a plurality of parallel, spaced circular cutting blades adjacent said discharge end, said blades having continuous peripheral cutting edges;

c) feeding filament waste into said waste inlet end;

d) conveying said waste toward said discharge end while compressing said waste, by moving one of said surfaces toward said discharge end;

e) pivoting at least one of said surfaces at said inlet end to vary the size of said discharge opening relative to the pressure exerted by said waste; and f) continuously cutting said filament waste with said cutting blades while discharging said waste from said discharge end.

16. The method of claim 15, wherein said waste is cut by moving blade peripheries downwardly and substantially vertically into engagement with said waste.

17. The method of claim 15, wherein said lower surface is stationary and said upper surface is moved toward said discharge end.

18. The method of claim 15, wherein said upper and lower surfaces are both moved toward said discharge end.

19. The method of claim 15, wherein said lower surface is moved toward said discharge end, while said upper surface is moved away from said discharge end, thereby leveling the waste as the waste is conveyed toward the discharge end.

20. The method of claim 15, further including the step of supporting said waste on a stationary surface while cutting said waste.

* * * * *